(12) United States Patent
Boren et al.

(10) Patent No.: US 7,190,791 B2
(45) Date of Patent: Mar. 13, 2007

(54) METHOD OF ENCRYPTION USING MULTI-KEY PROCESS TO CREATE A VARIABLE-LENGTH KEY

(76) Inventors: Stephen Laurence Boren, #209 - 188 Milross Avenue, Vancouver, British Columbia (CA) V6A 4J4; Andre Jacques Brisson, #701 - 1736 West 10th Avenue, Vancouver, British Columbia (CA) V6J 2A6

(*) Notice: Subject to any disclaimer, the term of this patent is extended or adjusted under 35 U.S.C. 154(b) by 681 days.

(21) Appl. No.: 10/299,847

(22) Filed: Nov. 20, 2002

(65) Prior Publication Data

US 2004/0096056 A1      May 20, 2004

(51) Int. Cl.
*H04K 1/02*     (2006.01)
*H04K 1/10*     (2006.01)
(52) U.S. Cl. .......................... 380/45; 380/280; 380/46
(58) Field of Classification Search ............... None
See application file for complete search history.

(56) References Cited

U.S. PATENT DOCUMENTS

| | | | |
|---|---|---|---|
| 3,706,941 A | 12/1972 | Cohn | |
| 4,058,673 A | 11/1977 | Johansson | |
| 4,375,579 A * | 3/1983 | Davida et al. | 380/28 |
| 4,791,594 A | 12/1988 | Harney et al. | |
| 5,414,771 A * | 5/1995 | Fawcett, Jr. | 380/44 |
| 5,533,128 A | 7/1996 | Vobach | |
| 5,666,414 A * | 9/1997 | Micali | 380/286 |
| 5,835,597 A | 11/1998 | Coppersmith et al. | |
| 6,104,811 A | 8/2000 | Aiello et al. | |
| 6,243,470 B1 * | 6/2001 | Coppersmith et al. | 380/259 |
| 6,307,940 B1 * | 10/2001 | Yamamoto et al. | 380/277 |
| 6,345,359 B1 | 2/2002 | Bianco | |
| 6,415,032 B1 | 7/2002 | Doland | |
| 6,490,353 B1 * | 12/2002 | Tan | 380/37 |

(Continued)

FOREIGN PATENT DOCUMENTS

EP      0 720 327 A2      7/1996

OTHER PUBLICATIONS

Ghodosi et al., "Pseudorandom Sequences obtained from Expansions of Irrational Numbers" presented at CPAC Conference "Cryptography Policy and Algorithms Conference", Queensland University of Technology, Brisbane, Australia, Jul. 3-5, 1995.

(Continued)

*Primary Examiner*—Gilberto Barrón, Jr.
*Assistant Examiner*—Venkat Perungavoor
(74) *Attorney, Agent, or Firm*—Oyen Wiggs Green & Mutala LLP

(57) ABSTRACT

In symmetric methods of encryption the key should be as long as the plaintext message. Such a key is difficult to generate if the plaintext data to be encrypted is enormous. The present invention provides a method of creating a random key of variable length which may be extremely long. It is generated by consecutively applying sub-keys having shorter non-repeating random lengths.

18 Claims, 2 Drawing Sheets

U.S. PATENT DOCUMENTS

| | | | |
|---|---|---|---|
| 2002/0080958 A1* | 6/2002 | Ober et al. | 380/44 |
| 2003/0016823 A1 | 1/2003 | Chung | |
| 2003/0039357 A1 | 2/2003 | Alten | |
| 2003/0048903 A1* | 3/2003 | Ito et al. | 380/263 |
| 2003/0081770 A1* | 5/2003 | Futa et al. | 380/28 |
| 2003/0210783 A1 | 11/2003 | Filippi | |

OTHER PUBLICATIONS

Carroll, John M., "Do-it-yourself Cryptography", Computers & Security, Elsevier Science Publishers, Amsterdam, NL, vol. 9, No. 7, Nov. 1, 1990, pp. 613-619.

* cited by examiner

METHOD OF ENCRYPTION USING MULTI-KEY PROCESS TO CREATE A VARIABLE-LENGTH KEY

TECHNICAL FIELD

The invention relates to the field of encryption methods and more particularly to a method for encrypting electronic communications using keys of variable length which may be extremely long.

BACKGROUND ART

Various methods of encryption to provide secure electronic communications are well known in the art. In symmetric methods of encryption, the sender and the recipient use the same code or key to encrypt and decrypt the message. The only completely secure cipher which cannot possibly be broken or deciphered is the One-Time Pad (OTP). A OTP takes a stream of bits that contains the plaintext message, and a secret random bit-stream of the same length as the plaintext (the key). To encrypt the plaintext with the key, each pair of bits from the key and plaintext is sequentially acted on by the exclusive-or function to obtain the ciphertext bit. The ciphertext cannot be deciphered if the key is truly random and the key is kept secret from an unauthorized party. The problem with this method is that the key should be at least the same length as the message. If a shorter key is used and repeated then the cipher can be broken. In some cases the data which needs to be encrypted is extremely large.

There is therefore a need for a method of generating a random key, or OTP, which is of variable length and that allows for encryption of very large amounts of data.

DISCLOSURE OF INVENTION

The present invention therefore provides a method of generating an encryption key having length x, the method comprising the steps of: i) selecting a number n of sub-keys each having a unique non-repeating length m; ii) generating n random numbers, one for each sub-key, each having length m; iii) generating a n+1 st random number R; iv) for each bit whose position in said nth random number is calculated as Modm(R) applying a function to all n bits to generate a binary value; v) concatenating said binary value to the end of the encryption key; and vi) repeating step iv) until the key is x bits in length. Preferably the selected length m of each sub-key is a prime number.

According to one aspect of the invention, each of the n random numbers is generated by: i) generating a first random number which is not a perfect square; ii) calculating the square root of the first random number; iii) generating a second random number; iv) commencing with a digit whose position in the first random number is calculated based on the second random number, taking finite strings of digits sequentially and converting each finite string into a hexadecimal byte; and vi) concatenating each hexadecimal byte sequentially to the random number until the selected length m of the random number has been reached.

The invention further provides a computer program product, an article for carrying out the method, and a data processing system for carrying out the method.

BRIEF DESCRIPTION OF DRAWINGS

In drawings which disclose a preferred embodiment of the invention.

BEST MODE(S) FOR CARRYING OUT THE INVENTION

Figure 1:
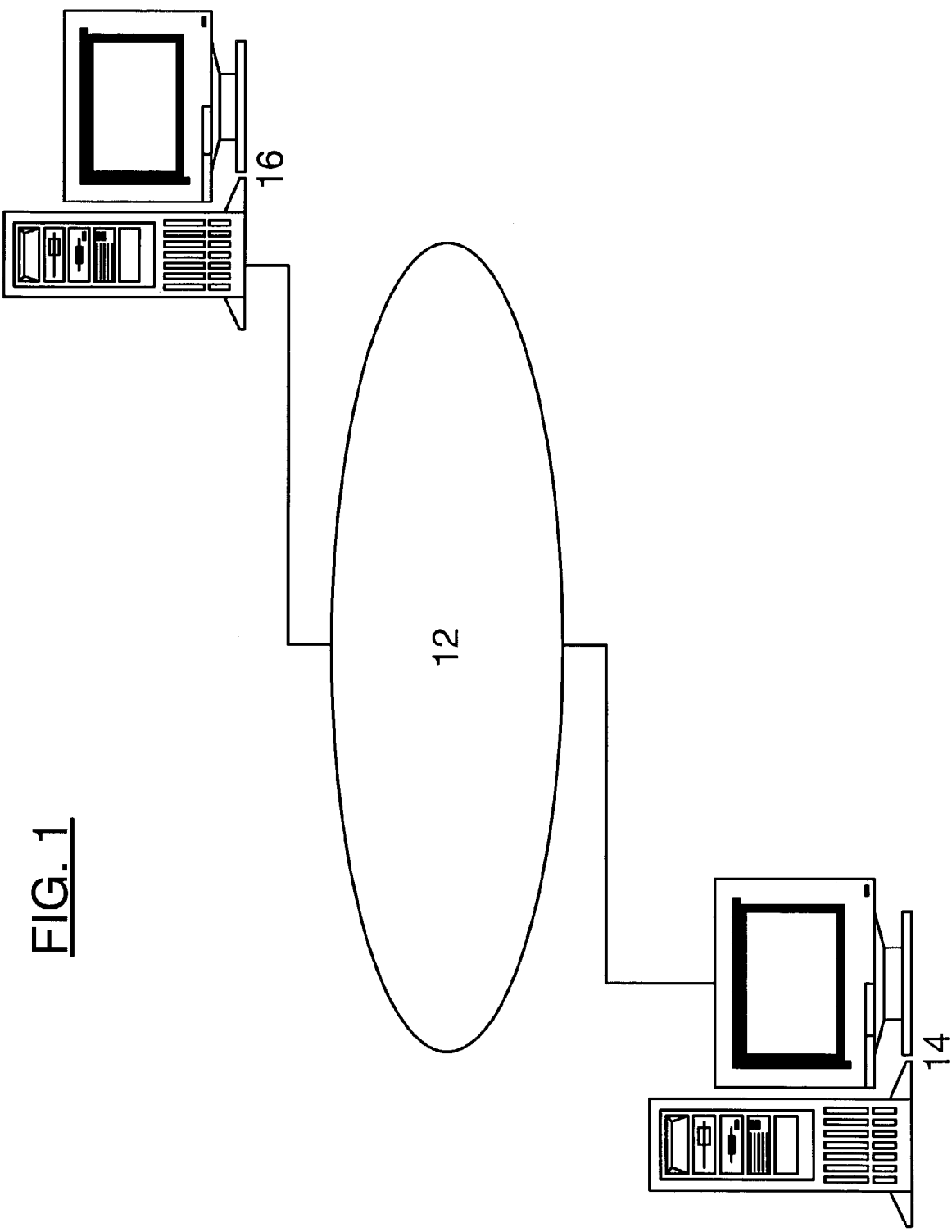
FIG. 1 is a schematic illustration of a computer system for carrying out the method of the invention.
Figure 2:
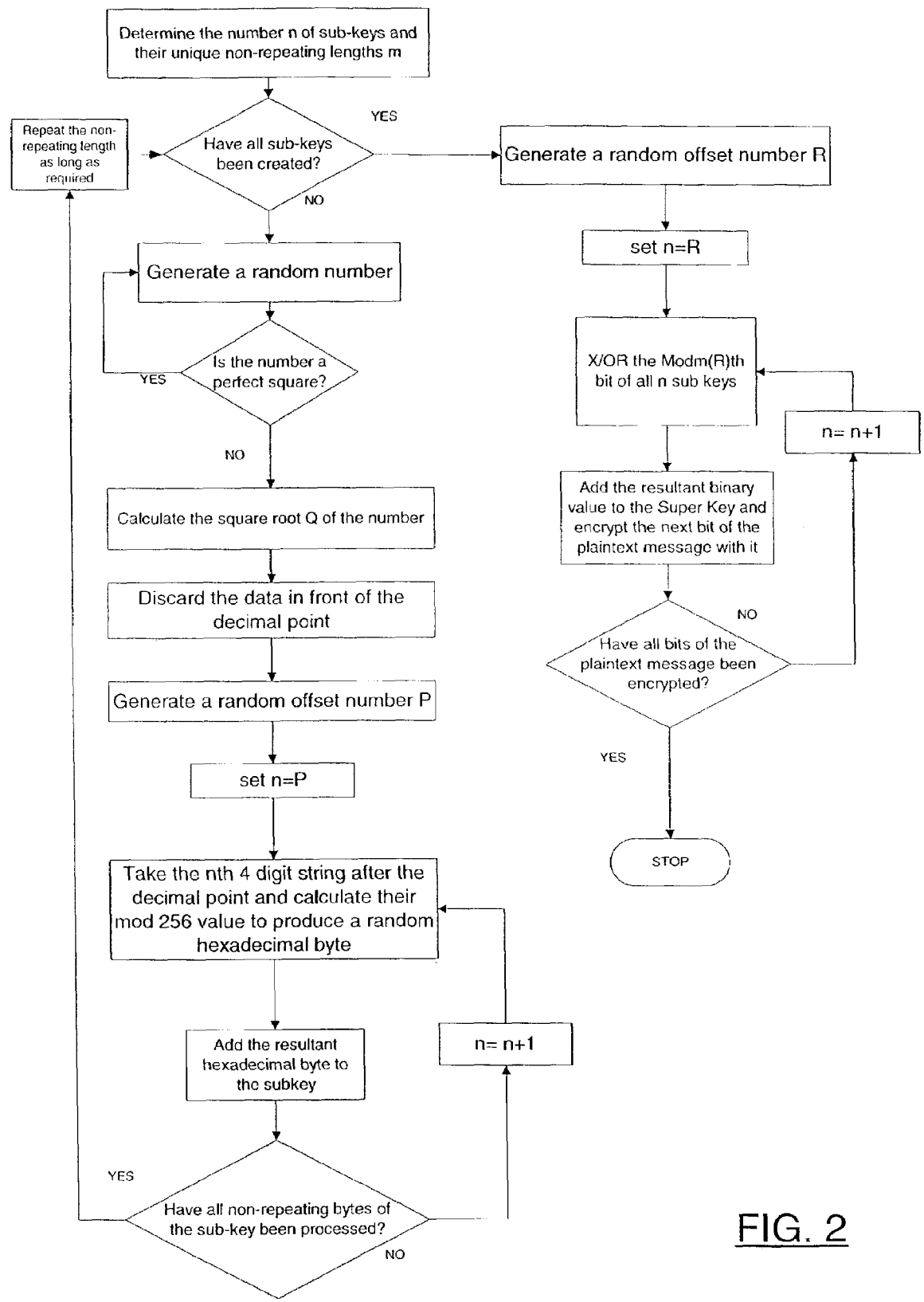
FIG. 2 is a flow chart illustrating the method of the invention.

FIG. 2 illustrates by way of a flowchart the method of generating the encryption key of the present invention. In particular an encryption key, a non-repeating key of indefinite length referred to herein as a Super Key, is formed by combining sub-keys. Any number n of sub keys $K_n$ can be specified depending on the application. The greater the number of sub-keys, the greater the length of the non-repeating Super Key. The length of each sub key is a prime number of bytes (preferably with prime numbers larger than 10).

The first step in the process is to determine how large a Super Key, or cipher, to deploy. The number of sub-keys and the non-repeating length of each sub-key, in bytes, is selected. The sub-keys each have a unique non-repeating length. No two sub-keys are of the same non-repeating length. Preferably the sub-key non-repeating lengths are prime numbers of bytes. The selection may be done by manually entering the number of sub-keys and their prime number non-repeating lengths. Alternatively, the number of keys and their prime number non-repeating lengths is programmed into an application, or a program randomly selects the number of sub-keys and their non-repeating length. For n sub-keys $K_n$, the non-repeating length of the Super Key will be Size $(K_1)$ X Size $(K_2)$ X Size $(K_3)$ ... X Size $(K_n)$. For example, assume 10 sub-keys of the following prime number non-repeating lengths are used:

Sub Key 1=13 bytes=$K_1$
Sub Key 2=17 bytes=$K_2$
Sub Key 3=19 bytes=$K_3$
Sub Key 4=23 bytes=$K_4$
Sub Key 5=29 bytes=$K_5$
Sub Key 6=31 bytes=$K_6$
Sub Key 7=37 bytes=$K_7$
Sub Key 8=41 bytes=$K_8$
Sub Key 9=43 bytes=$K_9$
Sub Key 10=47 bytes=$K_{10}$ The resulting non-repeating Super Key length is 13×17×19×23×29×31×37×41×43×47=266,186,053,068,611 bytes. Thus, using a small number of sub-keys, each of small prime number non-repeating length results in an extremely long non-repeating Super Key. The total definition for the size for the multi-key above is contained in 300 bytes and the header.

While preferably the non-repeating length of each sub-key is a prime number of bytes, to improve the randomness of the resulting cipher, the method will also work if non-prime number lengths are used, as long as the resulting cipher is very large.

Each sub-key of the multi-key process may be created as follows. First a random number which is not a perfect square is generated, preferably by a computer random number generator. This serves as a "first seed value" O. Random number generators that are included in the operating systems of most computers are pseudo-random and not very robust. These values, however, are sufficient as a starting point. It is verified that the selected value O is not a perfect square. If it is, then additional random values will be generated until one meets this criterion. A second random number P ("second seed value") is also generated by the computer's random number generator to serve as an offset to be utilized in this process. The square root Q of this first seed value O is calculated, resulting in an irrational number Q (one that extends infinitely after the decimal point since it is not evenly divisible). The resultant string of digits after the decimal point is potentially infinite in length and is highly random. The computer discards the digits in front of the decimal and computes the number Q up to P digits after the decimal. Then, starting at the Pth digit of Q after the decimal point, the computer sequentially selects 4 digits at a time, and calculates the Mod 256 value of the 4 digits. The single resultant random 8-bit byte may be represented in hexadecimal notation. This value is used as the first byte of the sub-key. This process is repeated 4 digits at a time, continuing with the next digits in sequence, until a string of random data equal to the prime number non-repeating length of the sub-key being created is completed. This process is repeated for all the sub keys until the non-repeating length for all the sub keys are created. Each sub-key then is formed by taking the non-repeating string of bytes thus created, and repeating it as often as necessary in combination with the other sub-keys to create the Super Key.

Once all the sub-keys are created as above, the Super Key (cipher) is created to the length required. This means the Super Key will continue to be created to encrypt the associated data to be encrypted, and continues to be created only until all the data is encrypted. First a random number R ("third seed value", or the starting offset for the Super Key, as opposed to the starting offset P for the number Q) is generated. Starting with any one of the n sub-keys, having length m, the Modm of R is calculated and the Modm(R)th byte of each sub-key is consecutively exclusive-or'd (X/OR'd) with the corresponding Modm(R)th byte of every other sub-key. For example, if R=100, and the length of the first sub-key is 97 bytes, then the 3rd byte of sub-key 1 is selected and X|OR'd with the corresponding bytes of the other remaining sub-keys based on R selected in the same way. The process is repeated until all the selected bytes from each sub-key have been X/OR'd. The resultant binary value is then added to the Super Key. The next, subsequent bytes of sub-key 1 is then X|OR'd with the next byte of Sub key 3 and so on. Again the process is repeated until all the selected bytes from each sub-key have been X/OR'd. The resulting binary value of each function is again added to the Super Key. While the X/OR function is preferred, it will be apparent that other functions can be applied. For example, mathematical functions of addition or subtraction can be used. As each byte of the Super Key is generated, the corresponding byte of the plaintext message is then encrypted with the corresponding byte of the Super Key by the exclusive-or function or some other mathematical function. Once all the bytes of the plaintext message have been encrypted the generation of the Super Key terminates. The encrypted message can then be decrypted applying the inverse of the encrypting function to it and the Super Key.

While preferably the random non-repeating string which forms each sub-key is generated as described above, the method will also work if the non-repeating string of each sub-key is simply generated by a random number generator to form each sub-key, as long as the overall resultant length of the Super Key is sufficiently large so that the resultant Super Key is at least double the size of the data to be encrypted.

The present invention is described above as a computer-implemented method. It may also be embodied as a computer hardware apparatus, computer software code or a combination of same. The invention may also be embodied as a computer-readable storage medium embodying code for implementing the invention. Such storage medium may be magnetic or optical, hard or floppy disk, CD-ROM, firmware or other storage media. The invention may also be embodied on a computer readable modulated carrier signal.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of generating a stream cipher having length x bytes, the method comprising the steps of:
   i) selecting a number n representing a number of sub-keys, and n unique prime numbers $m_n$ each representing a unique non-repeating sub-key length $m_n$ bytes;
   ii) generating n unique random numbers, each having non-repeating length $m_n$ bytes;
   iii) generating a n+1st random number R;
   iv) for each byte whose position in said $n^{th}$ random number is p, where p=R Mod $m_n$, consecutively applying a function to each $p^{th}$ byte of each of said n random numbers to generate a value;
   v) incrementing the value of p by 1; and
   vi) repeating step iv) and v) and concatenating each said value produced in step iv) to the previous value produced in step iv) until said stream cipher of x bytes in length has been produced.

2. The method of claim 1 wherein said selected length $m_n$ of each said sub-key is a prime number greater than 10.

3. The method of claim 1 wherein said function applied consecutively to each said $p^{th}$ byte of said n random numbers is the exclusive-or function, which is applied by obtaining the result of applying the exclusive-or function initially to the $k^{th}$ and the $k+1^{st}$ pair of $p^{th}$ bytes where k=1 and then consecutively incrementing k by 1 and applying the exclusive-or function to said result and the next $p^{th}$ byte.

4. The method of claim 1 comprising the further step of applying a delinearization function to said stream cipher.

5. The method of claim 4 wherein said delinearization function is a substitution cipher.

6. The method of claim 1 wherein each of said n random numbers are generated by:
   i) generating a $n+2^{nd}$ random number which is not a perfect square;
   ii) calculating the square root of said $n+2^{nd}$ random number;
   iii) generating a $n+3^{rd}$ random number;
   iv) commencing with a digit whose position in said square root of said $n+2^{nd}$ random number is calculated based on said $n+3^{rd}$ random number, taking finite strings of digits sequentially from said square root of said said $n+2^{nd}$ random number and converting each said finite string into a byte;
   v) concatenating each byte sequentially from said square root of said said $n+2^{nd}$ random number until the selected length $m_n$ of said each of said n random numbers has been reached.

7. The method of claim 6 wherein said finite strings of digits are at least 4 digits long.

8. The method of claim 7 wherein said finite string is converted into a byte by applying a mod function.

9. The method of claim 8 wherein said finite string is converted into a byte by applying a mod 256 function.

10. A computer program product embodied in a computer usable medium for generating a stream cipher having length x bytes, said computer program product comprising a computer usable medium having computer readable program code means embodied in said medium for:
  i) generating n unique random numbers, each having non-repeating length $m_n$ bytes where $m_n$ is a prime number;
  ii) generating a n+1st random number R;
  iii) for each byte whose position in said $n^{th}$ random number is p, where p=R Mod $m_n$, consecutively applying a function to each $p^{th}$ byte of each of said n random numbers to generate a value;
  iv) incrementing the value of p by 1; and
  v) repeating step iii) and iv) and concatenating each said value produced in step iii) to the previous value produced in step iii) until said stream cipher of x bytes in length has been produced.

11. The computer program product of claim 10 wherein said selected length $m_n$ of each said sub-key is a prime number greater than 10.

12. The computer program product of claim 10 wherein said function applied consecutively to each said $p^{th}$ bytes of said n random numbers is the exclusive-or function, which is applied consecutively by obtaining the result of applying the exclusive-or function initially to the $k^{th}$ and the $k+1^{st}$ pair of $p^{th}$ bytes where k=1 and then consecutively incrementing k by 1 and applying the exclusive-or function to said result and the next $p^{th}$ byte.

13. The computer program product of claim 10 wherein said computer usable medium has computer readable program code means embodied in said medium for the further step of applying a delinearization function to said stream cipher.

14. The computer program product of claim 13 wherein said delinearization function is a substitution cipher.

15. The computer program product of claim 10 wherein each of said n random numbers is generated by:
  i) generating a $n+2^{nd}$ random number which is not a perfect square;
  ii) calculating the square root of said $n+2^{nd}$ random number;
  iii) generating a $n+3^{rd}$ random number;
  iv) commencing with a digit whose position in said square root of said $n+2^{nd}$ random number is calculated based on said $n+3^{rd}$ random number, taking finite strings of digits sequentially from said square root of said said $n+2^{nd}$ random number and converting each said finite string into a generated byte;
  v) concatenating each generated byte sequentially until the selected length $m_n$ of said each of said n random numbers has been reached.

16. The computer program product of claim 15 wherein said finite strings of digits are at least 4 digits long.

17. The computer program product of claim 15 wherein said finite string is converted into a byte by applying a mod function.

18. The computer program product of claim 17 wherein said finite string is converted into a byte by applying a mod 256 function.

* * * * *